United States Patent Office — 3,708,258 — Patented Jan. 2, 1973

---

3,708,258
DYEING AND PRINTING HYDROPHOBIC FIBER IN AQUEOUS SULFONYL CARBAMIC ACID-TYPE DYESTUFF SOLUTIONS
Hans-Ulrich von der Eltz, Frankfurt am Main, Dieter Gunther, Kelkheim, Taunus, Karl-Heinz Krell, Kronberg, and Karl Matterstock, Hofheim, Taunus, Germany, and Hansjorg Vollmann, Coventry, R.I., assignors to Farbwerke Hoechst Aktiengesellschaft vormals Meister Lucius & Bruning, Frankfurt am Main, Germany
No Drawing. Filed June 28, 1971, Ser. No. 157,666
Claims priority, application Germany, June 30, 1970, P 20 32 238.7
Int. Cl. D06p 3/82
U.S. Cl. 8—21   7 Claims

ABSTRACT OF THE DISCLOSURE

Process for the dyeing and printing of hydrophobic fiber materials by treating the goods in the presence of an acid donor at temperatures above 50° C. with aqueous solutions of dyestuffs having the general formula

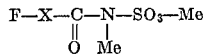

wherein F represents the radical of an organic dyestuff water-insoluble per se, X represents an —O—, a —S— or —NR— bridge member (R=a hydrogen atom or an alkyl, aryl, acyl or alkyl or arylsulfonyl group) and Me is an alkali metal or ammonium ion.

---

The present invention relates to a process for the dyeing and printing of hydrophobic fiber materials.

It is known that the disperse dyestuffs suitable for the dyeing and printing of synthetic fiber materials have to be submitted to a special physical and chemical treatment in frequently time-consuming and occasionally complicated operations, so that they form in water a stable dispersion permitting the individual particles to remain suspended for some time in the liquid—or as in the present case—in the dyebath. In the scope of said pre-treatment—generally termed dyestuff finish—required for conversion into an appropriate form for technological applicability, dispersing agents specific to each individual dyestuff, i.e. agents which are "compatible" with the product in question, are used. However, such dispersing agents frequently show different chemical characteristics and therefore cause undesired secondary reactions. Thus, if combinations of three or more than three dyestuffs are used, disturbances arise in the dyeing process between the individual dyestuff particles because of the differing dispersing agents. That means for example, that the dispersing agent of dyestuff A has a negative effect on the charge and consequently on the particle size of dyestuff B. The mutual action may attain such a high degree that—in the case of unfavorable external conditions—the dispersion breaks, whereupon the dyestuff flocculates and forms a deposit in the dyebath and on the goods to be dyed. Dyestuff precipitations of this kind, which—when dyeing wound packages—are observed in the exterior and interior yarn layers, produce dyeings which are useless for further processing.

For this reason, it has already been proposed in German specification No. 1,057,558 to convert temporarily the disperse dyestuffs provided for the dyeing and printing of synthetic fiber materials into a water-soluble form by incorporating into the dyestuff molecule solubilizing groups, such as the radicals of acidic sulfuric acid ester or of primary phosphoric acid ester. Aqueous solutions of the salts of disperse dyestuffs modified in this way are applied onto the goods to be dyed without using carrier substances and dispersing agents. During the dyeing process, in the presence of alkali-binding agents at elevated temperature, expediently between 100° and 130° C., the water-solubilizing group is hydrolyzed and the original coloring substance is reformed. These dyestuffs, however, have not become important in practice since cleavage to the insoluble product occurs incompletely only—independently of the operating temperature. Moreover, too large a residual amount of dissolved dyestuff is left in the dyebath, the dyeing process needs too much time, the fine distribution of the precipitated dyestuff never proceeds homogeneously and the particle size achieved in this manner is not small enough. Finally, the slow addition of acid also causes difficulties in practice.

It has now been found that the above-mentioned disadvantages in the dyeing and printing of hydrophobic fiber materials may be avoided and that dyeings and prints having high tinctorial strength together with good fastness properties are obtained when the goods are treated, in the presence of an acid donor at temperatures above 50° C., with aqueous solutions of dyestuffs having the general formula

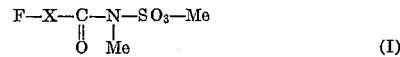

wherein F represents the radical of an organic dyestuff water-insoluble per se, X an —O—, a —S— or —NR— bridge member (R=a hydrogen atom or an alkyl, aryl, acyl or alkyl- or arylsulfonyl group) and Me represents an alkali metal or ammonium ion.

The dyeing according to the process of the present invention is preferably brought about according to the exhaustion method, either at temperatures reaching the boiling temperature of the dyebath—and in the presence of a usual carrier substance if required, or under high temperature dyeing conditions without such a carrier, depending on the fiber material. It is also possible to apply the dyestuff solutions by padding and to fix the applied dyestuffs by steaming or using the thermosol process. In this connection it has been observed that the dyestuffs, used in aqueous solution, show a surprising affinity for hydrophobic textile goods if the pH is slowly reduced to adjust the bath to a slightly acidic reaction, generally in the range of from pH 4 to 6.5, preferably of from pH 5 to 6. This effect is expediently effected by acid donors, which are mixed with the dyestuff solutions and which release hydrogen ions at moderately elevated temperatures. Other additives to the dyebaths or padding liquors do not interfere. If the usual printing auxiliaries and thickeners and an acid donor are added to aqueous solutions of the dyestuffs and the thus-prepared printing colors are applied to the fiber material, valuable prints are obtained after thermofixation.

The desired pH value is adjusted in a most simple and safe way by addition of ammonium sulfate to the dyestuff solution. Further appropriate acid donors are for example magnesium chloride, the sodium salt of the N-benzyl-sulfanilic acid or water-soluble esters which may be easily hydrolyzed such as tartaric acid dialkyl esters or phosphoric acid trialkyl esters. The required amount of these acid-yielding substances depends on the amount of dyestuff used and on the process conditions necessary in each case for the corresponding fiber material.

Hydrophobic fiber materials in the scope of the process according to the invention are textile materials of synthetic origin, for example from cellulose-2½-acetate, cellulose triacetate, polyacrylonitrile, polyamide, polyurethane and polyester fibers, especially from linear polyethylene terephthalate, as well as from mixtures of these synthetic fiber materials with wool or cellulose fibers. The textile goods to be colored may have very different processing shapes, for example they may be woven or knitted fabrics, cables, combed materials, fiber fleeces, texturized threads, staple fiber yarns, flocks and the like.

The insoluble dyestuffs with the parent element F forming the basis of the dyestuffs of the Formula I to be used according to the invention may belong to different classes of compounds. There may be mentioned for example mono and disazo dyestuffs, imide, nitro and anthraquinone dyestuffs, oxazine, thiazine and dioxazine dyestuffs, methine and polymethine dyestuffs, quinoline and phthalocyanine dyestuffs.

The water-soluble dyestuffs of the Formula I are prepared by reacting compounds of the general formula $$F\text{---}X\text{---}H \qquad (II)$$

wherein F and X are defined as above, with halogeno-sulfonyl-isocyanates of the general formula $$Hal\text{---}SO_2\text{---}N\text{=}C\text{=}O \qquad (III)$$

wherein Hal represents a fluorine, bromine or preferably chlorine atom, and subsequently converting the resulting intermediates containing halogeno-sulfonyl-urea, halogeno-sulfonyl carbamic acid ester, or halogeno-sulfonyl thiocarbamic acid ester groups into the dyestuffs of the Formula I by hydrolytic treatment with alkali metal or ammonium compounds or the salts thereof.

The new dyeing process is based on the principle that such disperse dyestuffs of the Formula I, water-solubilized as the result of substitution by a special chemical group, may be converted again into the water-insoluble form of the Formula II at elevated temperature. This water-insoluble form is originated at temperatures above 50° C. by cleavage of the solubilizing group. It is very surprising that under the specified pH conditions, the insoluble form is obtained in an extremely fine distribution. The degree of distribution is of a fineness which cannot be achieved by traditional mechanical methods nor has been obtained hitherto by chemical methods. The results of the fine distribution of the dyestuff particles, which does not proceed suddenly, but continuously, in the course of the dyeing process, are a better penetration of the fiber material by the dyestuff and better fastness properties, especially fastness to wet processing and to rubbing. This is of special advantage when dyeing closely charged wound packages: the individual yarn layers are penetrated without difficulty by the small particles without the dyestuff being precipitated or filtered off at the surface or in the interior of the bobbin. As a rule, the resulting dyeings have a higher tinctorial strength. Even those dyestuffs which—when applied in a dispersed form after having undergone a finish process—heretofore produced only a poor color intensity, now give higher color yields by applying in the initially soluble and then finely precipitated form. In general, more intense dyeings result from each kind of dyeing process, which permits the saving of considerable amounts of dyestuffs.

Moreover, it is possible according to the process of the present invention to shorten the dyeing periods and thus to obtain higher productive capacity as concerns the amount of dyed goods. This is of special advantage in the case of continuous dyeing methods, as for example of a steaming process or of a thermosol process. However, in these continuous operations, ammonium sulfate cannot be used in order to reduce the pH value of the dyebath. According to the temperatures which become effective, one of the acid donors suitable in this range must be employed, In the steaming process, the sodium salt of N-benzyl-sulfanilic acid is used, for example, and in the case of the thermosol process, tartaric acid diethyl ester is advantageously employed. The cleaning of the dyestuffs takes place in each case extremely exactly and completely.

From a physical and chemical interpretation of the mechanism upon dyeing, it appears that in this context the dyeing equilibrium is the most important constant element. As all factors of this kind, it especially depends on the type of the dyestuffs used and on the temperature.

From a knowledge of the dyeing equilibrium, the actual state of the dyeing, i.e. how much of the dyestuff is present in the bath and how much has been absorbed by the fiber, can be inferred. When using the normal and hitherto usual disperse dyestuffs, this dyeing equilibrium is displaced during the dyeing operation in favor of the dyestuff dispersed in the bath. At the beginning of the dyeing process the whole amount of dyestuff is in a relatively unstable condition, i.e. in the form of a dispersion. This form disappears only slowly and incompletely, too, when the dyestuff is absorbed by the fiber. Because of this instability, the danger always exists that the disperse dyestuff will undergo flocculation, i.e. that the dispersion will break.

In the new dyeing process, however, this risk is eliminated because the insoluble form is produced only progressively, corresponding to a chemical equilibrium between the cleaved and the non-cleaved (soluble) form. This insoluble and very finely distributed form is absorbed by the synthetic fiber under the respective dyeing conditions; the operation proceeds rather quickly because of the fine distribution and the relatively small amount of insoluble dyestuff in the dyebath, as compared with prior processes. Due to this behavior, the equilibrium is displaced again in favor of the absorbed dyestuffs, and consequently, new amounts of insoluble dyestuff are reproduced. This completely novel dyeing mechanism renders the dyeing of synthetic fiber material more reliable. Quite a number of possible trouble sources are eliminated: the whole finish process for a dyestuff of this kind is superfluous, because the product issuing from manufacture is only adjusted to a determined concentration. The dissolved dyestuff is present in the form of a true solution, consequently in a very stable condition. It is not possible to disrupt or to destroy the physical build-up of the dyebath. A true solution may at the best be destroyed by evaporation, but this case would contradict the use of these dyestuffs in practice.

The following examples serve to illustrate the invention.

EXAMPLE 1

200 mg. of a dyestuff having the formula

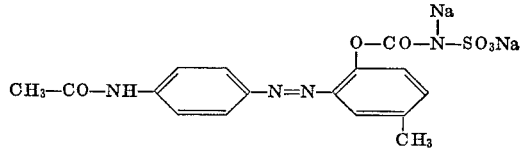

were dissolved at a temperature between 20° C. and 35° C. in 100 cc. of water, and this solution was mixed with 1 g. of ammonium sulfate. At a goods to liquor ratio of 1:10, 10 g. of a knitted fabric made from texturized polyester threads (polyethylene terephthalate) were introduced into the thus-prepared dyebath. The bath was heated in about 45 minutes to 125° C., and the goods were dyed for one hour at this temperature. Subsequently, the dyeing was rinsed for a short time, exposed for 10 to 20 minutes at 60°–70° C. to an after-treatment in a bath which contained, per liter of water, 2 g. of hydrosulfite, 2 cc. of an aqueous sodium hydroxide solution of 38° Bé and 1 g. of a non-ionic auxiliary, and then dried. A level full yellow dyeing with good fastness properties was obtained.

EXAMPLE 2

100 mg. of a dyestuff of the formula

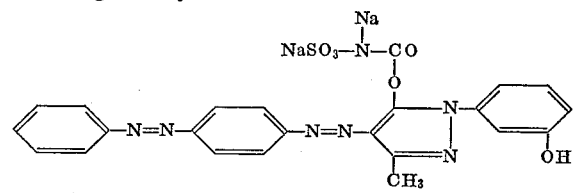

were dissolved as indicated in Example 1, and this solution was mixed with 1 g. of ammonium sulfate. Furthermore, 1.3 g. of well-emulsified methylnaphthalene oil were added as a carrier. At a goods to liquor ratio of 1:40, 10 g. of piece goods made from polyethylene terephthalate staple fibers were introduced into the thus-prepared dyebath, and the material was dyed for one hour at boiling temperature. After rinsing and after-treating the dyeing according to Example 1, a level colored fabric of golden yellow shade was obtained having good fastness properties.

EXAMPLE 3

300 mg. of a dyestuff of the formula

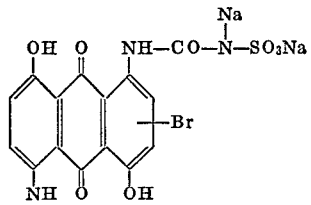

were dissolved as indicated in Example 1 and mixed with ammonium sulfate. Furthermore, 1.2 g. of well-emulsified o-phenyl-phenol were added as a carrier to this solution, and then 10 g. of polyester silk (piece goods made of polyethylene terephthalate endless threads) were introduced into the dyebath. In this case, dyeing was effected at a goods to liquor ratio of 1:5, as is usual for dyeing on a dye jig. The material was dyed for 1 hour at boiling temperature, and after rinsing and after-treating according to Example 1, a deep blue dyeing was obtained with good fastness properties.

Without an after-treatment, the same dyeing can be finished only by hot and cold rinsing without the fastness properties being negatively affected.

EXAMPLE 4

200 mg. of a dyestuff of the formula

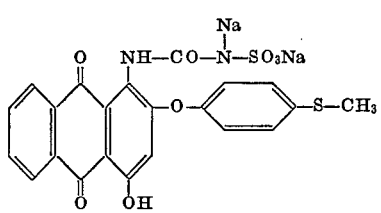

were dissolved according to Example 1, and to this solution 1 g. of ammonium sulfate and, as a carrier, 1.7 g. of salicylic acid methyl ester in a well emulsified form were added. At a goods to liquor ratio of 1:40, 10 g. of piece goods made from polyethylene terephthalate staple fibers were introduced into the dyebath thus prepared, and the material was dyed for 1 hour at 106-108° C. After rinsing and after-treating according to Example 1, a red dyeing was obtained having good fastness properties.

The same result may be obtained, when a mixed fabric composed of polyester fibers and wool, or of polyester fibers and cellulose is used according to the above dyeing method. After cleansing with an aqueous bath in the presence of a non-ionic detergent, dyeings were obtained in which the polyester fiber portion of the goods had a red tint.

EXAMPLE 5

200 mg. of a dyestuff of the formula

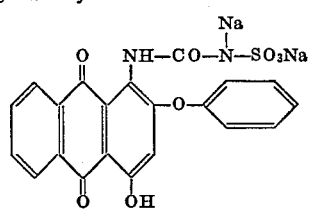

were dissolved as described in Example 1, and 1 g. of ammonium sulfate was added to this solution. 10 g. of a fabric made from cellulose-2½-acetate fibers were dyed in the dyebath thus prepared at a goods of liquor ratio of 1:5. The bath was heated within 30 minutes to 60°-65° C. and the material was dyed for 1 hour at this temperature. Then the dyed fabric was rinsed and dried. A red level dyeing was obtained.

EXAMPLE 6

100 mg. of a dyestuff having the formula

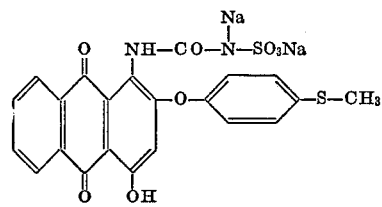

were dissolved as described in Example 1, and 1 g. of magnesium chloride was added to this solution. At a goods to liquor ratio of 1:30, 10 g. of a fabric made from cellulose triacetate fibers were dyed in this dyebath for 1 hour at 85° C. The bath was heated to the required temperature within 30 minutes. After rinsing and after-treating according to Example 1, a red dyeing showing high tinctorial strength was obtained.

EXAMPLE 7

200 mg. of a dyestuff of the formula

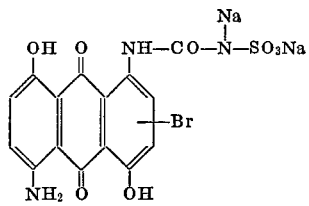

were dissolved as described in Example 1, and 1 g. of ammonium sulfate was added to this solution. At a ratio of goods to liquor of 1:20, 10 g. of a polyamide fabric were dyed in this dyebath for 1 hour at boiling temperature. The bath was heated to the required temperature within 30 minutes. After dyeing, the goods were rinsed and dried. A dark blue dyeing was obtained.

EXAMPLE 8

50 g. of a dyestuff of the formula

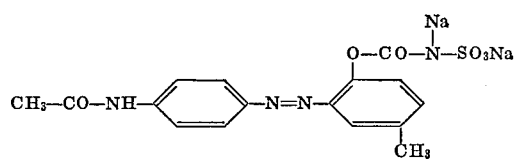

were dissolved in 1 liter of water as described in Example 1. With this solution, to which 5 g. of N-benzylsulfanilic acid (sodium salt) were added per liter, a fabric made of polyamide fibers was padded and then steamed for 10 minutes at 120° C. without an intermediate drying. The dyeing was after-treated after rinsing as indicated in Example 1. The thus-obtained goods had an intense yellow shade.

EXAMPLE 9

50 g. of a dyestuff of the formula

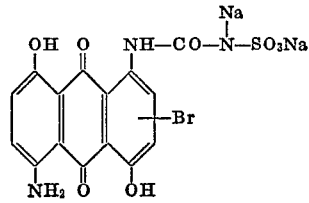

were dissolved in 1 liter of water as described in Example 1. A fabric made from polyethylene terephthalate fibers was padded with this solution, to which 5 g. of tartaric acid diethyl ester were added per liter, and then dried for 60 seconds at 90°–110° C. Subsequently, the goods were thermosolated for 60 seconds at 200° C. and after-treated as in Example 1. A completely level blue dyeing was obtained.

We claim:

1. A process for the dyeing and printing of hydrophobic fiber materials consisting of cellulose-2½-acetate, cellulose triacetate, polyacrylonitrile, polyamide, polyurethane, or linear aromatic polyester fibers, or mixtures of these fibers with wool or cellulose fibers, which comprises treating the fiber materials at temperatures above 50° C. with an aqueous solution consisting of a dyestuff of the formula

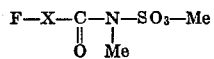

wherein F represents a water-insoluble anthraquinone or azo chromophore; X represents —O—, —S—, or

—NR—

R represents hydrogen, lower alkyl, phenyl, acetyl, lower alkylsulfonyl, or phenylsulfonyl; and Me represents an alkali metal ion or ammonium ion; and of an acid donor which gradually adjusts the pH of the dyestuff solution during the dyeing to a value from 4 to 6.5.

2. A process as in claim 1 wherein said acid donor is ammonium sulfate, magnesium chloride, the sodium salt of N-benzyl-sulfanilic acid, a tartaric acid di-lower alkyl ester, or a phosphoric acid tri-lower alkyl ester.

3. A process as in claim 1 wherein said fiber material is dyed by the exhaustion method at the boiling temperature.

4. A process as in claim 3 wherein a carrier is present.

5. A process as in claim 1 wherein said fiber material is dyed by padding.

6. A process as in claim 5 wherein the dyestuff is fixed by steaming.

7. A process as in claim 5 wherein the dyestuff is fixed by thermosolation.

References Cited

FOREIGN PATENTS 1,057,558  11/1960  Germany.

GEORGE F. LESMES, Primary Examiner

P. C. IVES, Assistant Examiner

U.S. Cl. X.R.

8—39, 41 R; 260—160, 207